United States Patent
Yim

(10) Patent No.: US 9,281,750 B2
(45) Date of Patent: Mar. 8, 2016

(54) POWER SUPPLY DEVICE AND IMAGE FORMING APPARATUS HAVING THE SAME

(71) Applicant: Samsung Electronics Co., Ltd., Suwon-si (KR)

(72) Inventor: Kwan-bin Yim, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/560,564

(22) Filed: Dec. 4, 2014

(65) Prior Publication Data

US 2015/0222190 A1 Aug. 6, 2015

(30) Foreign Application Priority Data

Feb. 4, 2014 (KR) .................. 10-2014-0012396

(51) Int. Cl.
| | |
|---|---|
| G06K 15/00 | (2006.01) |
| H02M 3/335 | (2006.01) |
| H02M 1/088 | (2006.01) |
| H02M 1/32 | (2007.01) |
| G06F 3/12 | (2006.01) |

(52) U.S. Cl.
CPC ......... *H02M 3/33507* (2013.01); *G06K 15/408* (2013.01); *H02M 1/088* (2013.01); *H02M 1/32* (2013.01)

(58) Field of Classification Search
None
See application file for complete search history.

(56) References Cited

U.S. PATENT DOCUMENTS

| | | | |
|---|---|---|---|
| 2003/0034853 A1* | 2/2003 | Chou | 332/109 |
| 2006/0158909 A1* | 7/2006 | Hawley | 363/21.12 |
| 2007/0097715 A1* | 5/2007 | Choi | 363/24 |
| 2011/0199630 A1* | 8/2011 | Oozawa | 358/1.14 |

* cited by examiner

*Primary Examiner* — Dov Popovici
(74) *Attorney, Agent, or Firm* — Staas & Halsey LLP

(57) ABSTRACT

A power supply device includes a transformer including primary winding and secondary winding, a sensor configured to sense at least one of output voltage and output current in the power supply device, a pulse width modulation (PWM) controller configured to perform PWM switching so that voltage is selectively provided to the primary winding based on one of the sensed output voltage and output current, and a regulator configured to stop PWM switching of the PWM controller and keep the PWM switching in stopped state when at least one of the sensed output voltage and output current exceeds a preset value.

17 Claims, 9 Drawing Sheets

200

FIG. 9A
FIG. 9B
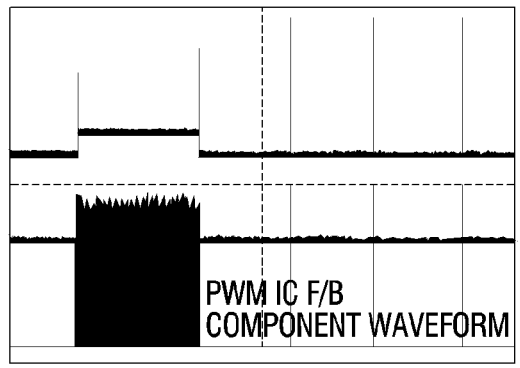
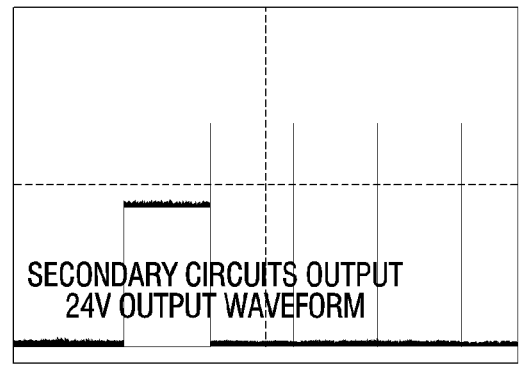

POWER SUPPLY DEVICE AND IMAGE FORMING APPARATUS HAVING THE SAME

CROSS-REFERENCE TO RELATED APPLICATIONS

This application claims the priority benefit from Korean Patent Application No. 10-2014-0012396, filed on Feb. 4, 2014 in the Korean Intellectual Property Office, the disclosure of which is incorporated herein by reference in its entirety.

BACKGROUND

1. Field

Embodiments relate to a power supply device and an image forming apparatus having the power supply device, and more specifically, to a power supply device configured to limit auto-restarting of pulse width modulation (PWM) IC and an image forming apparatus including the same.

2. Description of the Related Art

An image forming apparatus operates to generate print data, and perform printing, receiving and transmitting such image data. Representative examples may be printers, scanners, copy machines, fax machines or multi-functioned units combining the foregoing functions therein.

The image forming apparatus is provided with electrical power by using internal switched-mode power supply (SMPS). SMPS includes a PWM IC which provides a protection function against external situations through circuit constitutions. PWM IC includes protection functions such as OCP (over current protection), OLP (over load protection), OVP (over voltage protection), or TSD (thermal shot down protection), and PWM IC performs controlling load characteristics on secondary circuits by performing the feedback controlling.

When protection functions are performed as described above, PWM IC performs auto-restart function. However, regarding loss on the secondary circuits as well as temporary increases of loading, voltage and current, when PWM IC is auto-restarted with the protection operation, peak voltages may occur in FFT, second output diode and second output voltage due to delivered energy at the time point of switching for the auto-restart. Thus, there may be a problem that secondary bad operating occurs. The problem will be explained by referring to FIGS. 9A and 9B.

FIGS. 9A and 9B illustrate output waveforms in the related PWM IC when transient situation occurs. FIG. 9A illustrates PWM switching waveforms in transient situation and FIG. 9B illustrates waveforms of output voltage on the secondary circuits in transient situation.

Referring to FIGS. 9A and 9B, when preset time elapses since the PWM signal output is stopped in response to transient situation as sensed, the PWM IC automatically performs the auto-restart. Thereby, peak voltage of output voltage is generated at the primary and secondary circuits.

When output voltage on the secondary circuits exceeds a preset voltage, PWM IC senses this and accordingly stops PWM operation. When output voltage on the secondary circuits is stabilized, PWM IC performs PWM operation again with the auto-restart. At this process, the second diode, i.e., an output end may generate peak voltage. As the auto-restart is repeatedly performed, the components of the secondary circuits are subject to stress. Further, when peak voltage is repeatedly outputted, components connected to the secondary circuits may be damaged.

SUMMARY

One or more embodiments overcome disadvantages described above and other disadvantages not described above. Also, embodiments are not required to overcome the disadvantages described above, and an exemplary embodiment may not overcome any of the problems described above.

In an aspect of one or more embodiments, there are provided a power supply device configured to limit auto-restarting of PWM IC and an image forming apparatus having the power supply device.

In an aspect of one or more embodiments, there is provided a power supply device which is provided, which may include a transformer including primary winding and secondary winding, a sensor configured to sense at least one of output voltage and output current regarding the power supply device, a pulse width modulation (PWM) controller configured to perform PWM switching so that voltage is selectively provided to the primary winding based on one of the sensed output voltage and output current, and a regulator configured to stop PWM switching of the PWM controller and keep the PWM switching in stopped state when at least one of the sensed output voltage and output current exceeds a preset value.

The PWM controller may provide auto-restart function when a protection function is required, and the regulator may perform the auto-restart function of the PWM controller so as not to operate when at least of the output voltage and output current exceeds a preset value.

The protection function may be at least one of OCP (over current protection), OLP (over load protection), OVP (over voltage protection) and TSD (thermal shot down protection).

The PWM controller may be PWM IC including a brown in/out terminal.

The regulator may provide a preset first size of voltage to the brown in/out terminal when at least one of the output voltage and output current exceeds a preset value.

The regulator may include a voltage distributor configured to distribute input voltage at a preset voltage ratio, a regulating circuit configured to be conducted in response to size of the output power or output current, and a transistor configured to be turned on when the regulating circuit is conducted, and continuously output output voltage of the voltage distributor.

The transistor may include a first transistor configured so that a base is connected to an output end of the regulating circuit, and a collector is connected to the brown in/out terminal of the PWM controller, and a second transistor configured so that a base is connected to an emitter of the first transistor, a collector is commonly connected to an output end of the regulating circuit and the base of the first transistor, and an emitter is connected to an output end of the voltage distributor.

The transformer may additionally include third winding which alternates in voltage size proportionally to voltage of the secondary winding, and the regulating circuit may deliver the voltage of the third winding to the transistor.

The regulating circuit may include a zener diode configured to connect a cathode to one end of the third winding, and a resistance configured to connect one end to anode of the zener diode, and connect the other end to inputting end of the transistor.

The sensor may include a photo coupler configured to output corresponding voltage to the output voltage or output current. The regulating circuit may deliver voltage of the photo coupler to the transistor.

The regulator may additionally include a switching unit configured to selectively provide output signal of the transistor to the PWM controller.

The power supply device may additionally include a micro-computer configured to control the switching unit not to provide output signal of the transistor to the PWM controller so that the auto-restart function of the PWM controller is applied under a first condition, and to provide output signal of the transistor to the PWM controller so that the auto-restart function of the PWM controller is not applied under a second condition.

The first condition may include instant transient situation such as surge or ESD (electrostatic discharge), and the second condition may include transient situation due to feedback loss of output loads on secondary circuits.

In an aspect of one or embodiments, there is provided an image forming apparatus, which may include a power supply device configured to provide power to the image forming apparatus, a communication interface configured to receive printing data, an image former configured to print the received printing data, and a controller configured to determine types of errors in the power supply device and control operation of the power supply device according to the determined error type. The power supply device may include a transformer including a primary winding and a secondary winding, a sensor configured to sense at least one of output voltage and output current of the power supply device, a pulse width modulation (PWM) controller configured to perform PWM switching so that voltage is selectively provided to the primary winding based on one of the sensed output voltage and output current, and a regulator configured to stop PWM switching of the PWM controller and keep the stop PWM switching in stopped state when at least one of the sensed output voltage and output current exceeds a preset value.

The controller may control output signal of the transistor not to be provided to the PWM controller so that auto-restart function of the PWM controller is applied under a first condition, and control output signal of the transistor to be provided to the PWM controller so that the auto-restart function of the PWM controller is not applied under a second condition.

The first condition may include instant transient situation such as surge or ESD (electrostatic discharge), and the second condition may include transient situation due to feedback loss of output loads on secondary circuits.

The PWM controller may provide the auto-restart function when a protection function is required, and the regulator may perform the auto-restart function of the PWM controller so as not to operate when at least one of the output voltage and output current exceeds a preset value.

The power supply device may be switched-mode power supply (SMPS).

In an aspect of one or more embodiments, there is provided a power supply device, including a transformer comprising primary winding and secondary winding; a sensor configured to sense at least one of output voltage and output current of the power supply device; a pulse width modulation (PWM) controller configured to perform PWM switching so that voltage is selectively provided to the primary winding based on at least one of the sensed output voltage and sensed output current; a regulator configured to stop PWM switching of the PWM controller and keep the PWM switching in stopped state when at least one of the sensed output voltage and sensed output current exceeds a preset value; and a micro-computer configured to control the regulator not to provide a signal to the PWM controller so that the auto-restart function of the PWM controller is applied under a first condition, and to provide a signal to the PWM controller so that the auto-restart function of the PWM controller is not applied under a second condition.

BRIEF DESCRIPTION OF THE DRAWINGS

The above and/or other aspects of embodiments will be more apparent by describing certain exemplary embodiments with reference to the accompanying drawings, in which:

FIGS. 9A and 9B illustrate waveform diagrams of usual PWM IC output when transient situation occurs.

DETAILED DESCRIPTION

Figure 1:
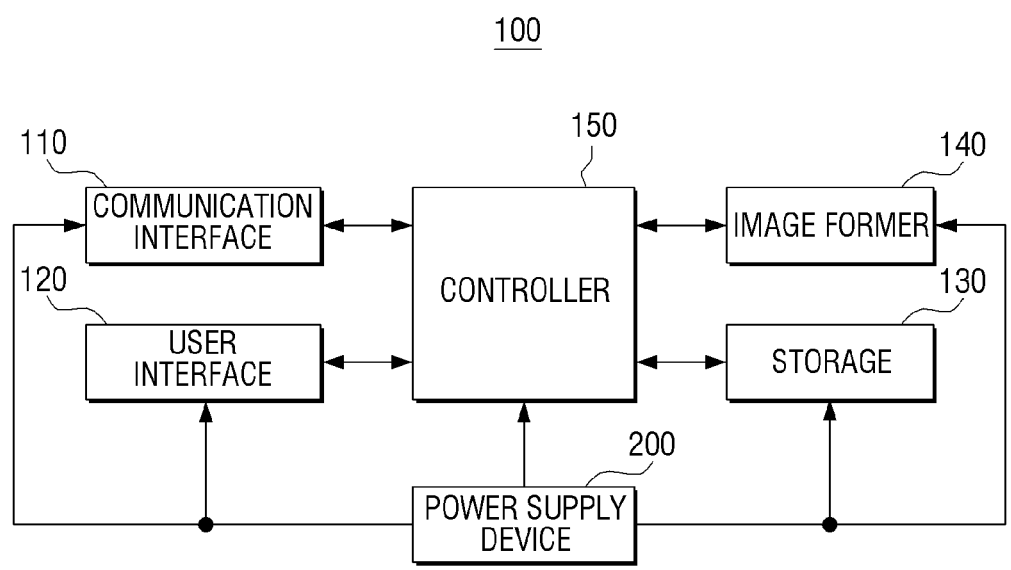
FIG. 1 is a block diagram of an image forming apparatus according to an embodiment.

Reference will now be made in detail to embodiments, examples of which are illustrated in the accompanying drawings, wherein like reference numerals refer to the like elements throughout. Embodiments are described below by referring to the figures.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present disclosure. Accordingly, it is apparent that exemplary embodiments are carried out without those specifically defined matters. Also, well-known functions or constructions are not described in detail since they would obscure embodiments with unnecessary detail.

FIG. 1 is a block diagram of an image forming apparatus according to an embodiment.

Referring to FIG. 1, the image forming apparatus 100 may include a communication interface 110, a user interface unit 120, a storage 130, an image former 140, a controller 150 and a power supply device 200. The image forming apparatus 100 according to an embodiment may be a printer, a copy machine, a fax machine, or a multi-functioned machine combining the foregoing functions.

The communication interface 110 is provided to connect the image forming apparatus 100 to a print controlling terminal (not illustrated); this may be implemented in such a form that is connected through USB (universal serial bus) port and wireless communication methods (e.g., GSM (global system for mobile), UMTS (universal mobile telecommunications system), LTE (long term evolution)) as well as form that is connected through LAN (local area network) and internet network. Communication between the communication interface 110 of the image forming apparatus 100 and a printing control terminal may be implemented over a wired or wireless network, or a combination thereof. The network may include a local area network (LAN), wireless local area network (WLAN), wide area network (WAN), personal area network (PAN), virtual private network (VPN), or the like. For example, wireless communication between the communication interface 110 of image forming apparatus 100 and a print controlling terminal in example embodiments may be performed via a wireless LAN, Wi-Fi, Bluetooth, Zigbee, Wi-Fi direct (WFD), ultra wideband (UWB), infrared data association (IrDA), Bluetooth low energy (BLE), near field communication (NFC), a radio frequency (RF) signal, and the like. For example, wired communication between the communication interface 110 of image forming apparatus 100 and a print controlling terminal of the example embodiments may be performed via a pair cable, a coaxial cable, an optical fiber cable, an Ethernet cable, and the like Further, the communication interface 110 may receive job data (e.g., printing data, fax transmitting data) from the print controlling terminal (not illustrated), and transmit job data generated in the image forming apparatus 100 (e.g., scanning data, fax receiving data) to the print controlling terminal. Herein, printing data may be data of printer languages such as PS (Postscript) and PCL (Printer Control Language). When the image forming apparatus 100 supports the direct-printing, printing data may be files themselves such as PDF (portable document format), XPS (XML paper specification or extensible markup language paper specification file format), BMP (bitmap file format), and JPG (JPEG or joint photographic expert group file format).

The user interface unit 120 includes a plurality of function keys that a user can establish or select various functions supported from the image forming apparatus 100, and displays various pieces of information provided on the image forming apparatus 100. The user interface unit 120 may be implemented to be device that can simultaneously perform the input and the output such as touch pad, or device combining a plurality of buttons with a monitor.

The storage 130 stores printing data. For example, the storage 130 may store the received printing data from the communication interface 110. Such storage 130 may be implemented to be external storing medium, removable disk including USB memory, or web server through network as well as storing medium within the image forming apparatus 100.

The image former 140 may output printing data. For example, the image former 140 may perform printing jobs regarding the received printing data through the communication interface 110 or the prestored printing data in the storage 130.

In one or more embodiments, the image forming apparatus 100 includes the image former 140 to perform printing jobs, but is not limited thereto. Accordingly, when the image forming apparatus 100 supports fax functions such as fax transmitting and fax receiving, a fax processor to perform fax functions can be included. Further, when the image forming apparatus 100 supports scan functions, a scan processor to perform scan functions may be additionally included.

The controller 150 performs controlling regarding components within the image forming apparatus 100. For example, when printing jobs are received through the communication interface 110, the controller 150 may control the image former 140 to perform the printing regarding the received printing jobs.

The controller 150 senses errors which occur in the power supply device 200, and analyzes the sensed errors. Further, the controller 150 may determine whether to apply auto-restarting (or hard-switching) of PWM IC according to the analyzed errors. For example, regarding errors in instant transient situation such as surge or electrostatic discharge, the controller 150 may control PWM IC to apply the auto-restart of PWM IC. Regarding errors in transient situation due to feedback loss of secondary output loads on the secondary circuits, the controller 150 may control PWM IC not to apply the auto-restart of PWM IC. An example of a circuit constitution to control PWM IC will be explained below by referring to FIG. 3.

The power supply device 200 provides electrical power to each unit of the image forming apparatus 100. For example, the power supply device 200 may externally receive input of AC power, convert and output AC power into DC power having a preset size (value). In one or more embodiments, one DC power is outputted; however, when the image forming apparatus 100 uses a plurality of DC powers having different sizes to each other (different values from each other), the power supply device 200 may output a plurality of DC powers having different sizes to each other (different values from each other). Examples of function and operation of the power supply device 200 will be described below by referring to FIG. 2.

The image forming apparatus 100 according to an embodiment limits the auto-restart function of PWM IC when transient situation occurs due to feedback loss of output loads on the secondary circuits. Thus, the system security is enhanced.

FIG. 1 illustrates and explains that the power supply device 200 is included in the image forming apparatus 100. However, the power supply device 200 may be implemented to be separate device; in this example, the power supply device 200 may be applied to any type of electronic apparatuses which request sensing whether to provide electrical power.

Figure 2:
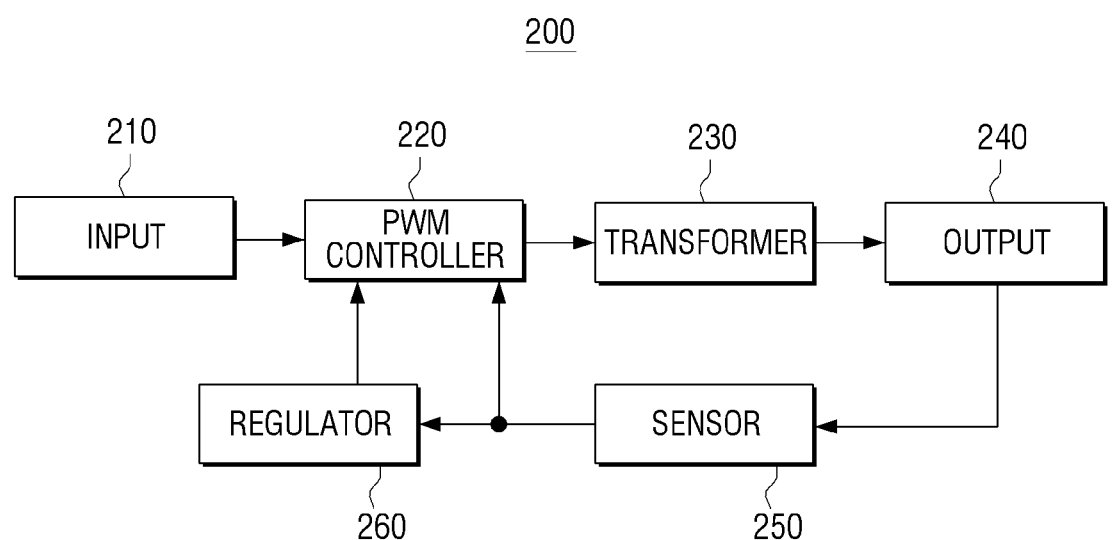
FIG. 2 is a block diagram of a power supply device according to an embodiment.

FIG. 2 is a block diagram of the power supply device according to an embodiment.

Referring to FIG. 2, the power supply device 200 may include an input 210, PWM controller 220, a transformer 230, an output 240 (output circuit 240), a sensor 250 and a regulator 260.

The input 210 receives input of AC power, converts and outputs the inputting AC power into DC power having preset size. For example, the input 210 may receive input of normal commercial alternated electrical power (e.g., 230V, 50 Hz), convert and output the inputting commercial alternated electrical power into DC electrical voltage having preset size by using rectifier circuits and smoothing circuits. One or more embodiments describe that AC power is externally inputted, and converted into DC power to be used; however, when being implemented, the input may receive input of DC power without another converting operation.

PWM controller 220 performs PWM switching to selectively provide electrical voltage to primary winding of the transformer 230 so that voltage having preset size is outputted on the output 240. At this process, PWM controller 220 may receive information regarding sizes of voltage and/or current in the output 240 from the sensor 250 which will be described below, and perform the feedback controlling according to sizes of the received voltage and/or current.

Further, PWM controller 220 senses whether the protection functions are requested. For example, PWM controller 220 may receive information regarding sizes of voltage and/or current in the output 240 from the sensor 250 to be described below, and determine whether the protection functions are requested based on the information. Herein, the protection functions are OCP (over current protection), OLP (over load protection), OVP (over voltage protection) and TSD (thermal shot down protection).

Further, when the protection functions are requested, PWM controller 220 may stop PWM switching. When preset time elapses after the protection functions are performed, PWM controller 220 automatically includes the auto-restart. Such auto-restart may be limited according to external controlling signals. For example, when PWM controller 220 is PWM IC including brown in/out terminal, activating the auto-restart function is controlled through the brown in/out terminal.

The transformer 230 transforms values of voltage or current regarding alternated electricity by using electromagnetic inducing phenomenon. For example, the transformer 230 includes primary winding and secondary winding, and electrical power is supplied and outputted to the secondary winding correspondingly to the inputting electrical power of the primary winding. Herein, the primary winding and the secondary winding may have preset coil ratio. One or more embodiments describe that the transformer 230 includes two coils; however, the transformer 230 may include more than three coils when being implemented. In this example, a third winding may be used to be additional voltage for operation of PWM controller 220, or to sense sizes of electrical power outputted from the secondary winding. A circuit diagram of a power supply device will be described by referring to FIG. 3.

The output 240 rectifies and smoothes electrical power outputted from the transformer 230, and outputs. Further, the output 240 may connect the sensor 250 to measure voltage and/or current of the outputting electrical power.

The sensor 250 senses at least one of output voltage and output current of the power supply device 200. For example, the sensor 250 may sense output voltage or output current by using a photo coupler which outputs corresponding voltage to output voltage or output current of the output 240.

When output voltage and/or output current are more than a preset value, i.e., when it is over voltage and/or over current situation, the regulator 260 may control PWM controller 220 not to perform the auto-restart function of PWM controller 220. For example, when at least one of output voltage and output current exceeds a preset value, the regulator 260 may control the stop of PWM switching in PWM controller 220 to be continued. For example, when PWM controller 220 is PWM IC including brown in/out terminal and when at least one of output voltage and output current exceeds a preset value, the regulator 260 may continuously provide preset first size of voltage to the brown in/out terminal. An example of a circuit constitution of the regulator 260 will be described below by referring to FIG. 3.

The power supply device 200 according to the above embodiment limits the auto-restart function of PWM IC when preset conditions are met. Thus, energy is delivered to a rectifier on the secondary circuits by the auto-restart of PWM IC, and output of temporary peak voltage is prevented. Therefore, stress of circuit components within the power supply device 200 may be alleviated, bad operation of circuits may be minimized, and thus, the system security is not affected.

Figure 3:
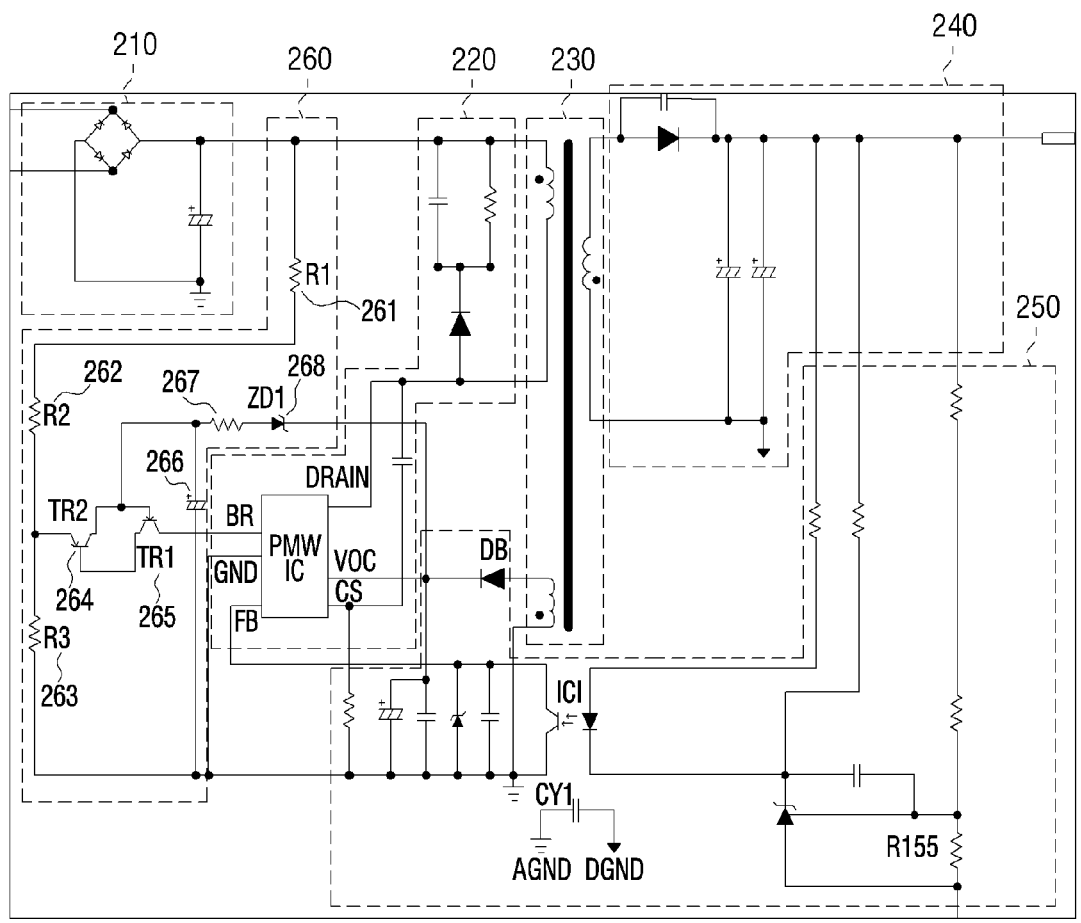
FIG. 3 is a circuit diagram of the power supply device according to an embodiment.

FIG. 3 is a circuit diagram regarding the power supply device according to a first embodiment. For example, the power supply device according to the first embodiment determines whether limiting the auto-restart function of PWM controller 220 is performed or not based on output voltage.

Referring to FIG. 3, the power supply device 200 may include the input 210, PWM controller 220, the transformer 230, the output 240, the sensor 250, and the regulator 260.

The input 210 includes rectifier circuits and smoothing components, converts AC power into DC power having preset size and provides to the transformer 230.

PWM controller 220 is PWM IC including brown in/out terminal. PWM IC includes drain component and ground component for PWM-performing regarding the primary winding of the transformer 230. Further, PWM IC includes FB component, CS component, and VCC component to sense output voltage and output current. Further, PWM IC includes brown in/out terminal (BR) which receive selecting whether the auto-restart function is activated or not.

The transformer 230 includes the primary winding, the secondary winding, and the third winding. One end of the primary winding connects output end of the input 210, and the other end of the primary winding connects the drain component of PWM IC. The secondary winding connects the output 240. One end of the third winding connects VCC component of PWM IC, and the other end of the third winding connects the primary circuit grounding. Herein, electrical potential of the third winding is converted proportionally to electrical potential of the secondary winding. Thus, when power of the output 240 changes, electrical potential of the secondary winding changes, and thus, electrical potential of the third winding changes proportionally to turning ratio of the transformer 230. Because electrical potential of the third winding alternates proportionally to output voltage, the regulator 260 may determine whether output voltage exceeds preset voltage by receiving input of output voltage regarding the third winding. The above operation corresponds to OVP operation according to increasing of output voltage on the secondary circuits due to feedback loss.

The output 240 rectifies, smoothes, and outputs output voltage from one end of the secondary winding in the transformer 230 by using diodes and capacitors.

The sensor 250 includes a plurality of resistances, emitting diodes, and the photo coupler, senses output current and provides to PWM IC. Herein, optical amount of the emitting diodes changes correspondingly to sizes of output voltage or output current, and the photo coupler outputs voltage value corresponding to the sensed optical amount.

The regulator 260 includes voltage distributors 261, 262, 263, regulating circuits 266, 267, 268, and transistors 264, 265.

The voltage distributors 261, 262, 263 distribute input voltage at a preset voltage ratio. For example, the voltage distributors 261, 262, 263 may connect to output end of the input 210 in parallel, and distribute voltage of the output end in the input 210 (i.e., input voltage) at a preset voltage ratio by using a plurality of resistances connected in series. Herein, voltage ratio may be adjusted according to preset voltage necessary for the regulator 260.

The regulating circuits 266, 267, 268 provide corresponding voltage values to output voltage. For example, when voltage regarding the third winding of the transformer 220 is preset voltage (i.e., voltage informing over voltage), the regulating circuits 266, 267, 268 deliver voltage to turn on the transistors 264, 265. The regulating circuits 266, 267, 268 may be constituted with the capacitor 266, the resistance 267, and zener diode 268.

Regarding the zener diode 268, cathode connects one end of the third winding, and anode connects one end of the resistance 267. The zener diode 268 is conducted at preset voltage. Herein, preset voltage is size of voltage that can deliver voltage of the third winding to the transistors when output voltage is overloaded.

Regarding the resistance 267, one end connects anode of the zener diode, and the other end commonly connects inputting ends of the transistors 264, 265 and one end of the capacitor 266.

Regarding the capacitor 266, one end commonly connects inputting ends of the transistors 264, 265 and the other end of the resistance 267, and the other end connects grounding of the primary circuits.

When the zener diode 268 is conducted, the transistors 264, 265 are turned on and continuously output output voltage of the voltage distributors 261, 262, 263. For example, the transistors 264, 265 may be constituted with the first transistor 265 and the second transistor 264.

Regarding the first transistor 265, base commonly connects output ends of the regulating circuits 266, 267, 268 and collector of the second transistor 264, collector connects brown in/out terminal (BR) of PWM controller 220, and emitter connects base of the second transistor 264.

Regarding the second transistor 264, the base connects to the emitter of the first transistor 265, the collector commonly connects output ends of the regulating circuits 266, 267, 268, and the base of the first transistor 265, and emitter connects output ends of the voltage distributors 261, 262, 263.

The following will explain operation of the power supply device by referring to the circuit constitution of FIG. 3.

First, inputting alternated power to the power supply device 200 is rectifies and smoothed through a bridge diode and a main capacitor, and approved to the primary winding of the transformer 230. The power is approved to FET drain component of PWM IC 220, and drain restarting is first performed by approving gate voltage of FET according to controlling operation within PWM IC.

Restarting resistance is operating within PWM IC with the drain voltage of FET within PWM IC, and FET on the primary circuits is switched with Vcc coil voltage after passing through magnetic biased sections of Vcc component regarding PWM IC.

Energy is delivered from a section where PWM IC does not operate to the secondary circuits by fly-back operating. Output voltage on the secondary circuits is rectified with the diode and the capacitor, and regular output voltage is obtained through a shunt regulator.

Output voltage on the secondary circuits increases when transient situation occurs such as short of the photo coupler controlling feedback signals of the first and the secondary circuits or open of the shunt regulator while usual outputting operation is performed.

As output voltage on the secondary circuits increases, voltage per output turn in the transformer increases. With increasing effects, voltage of the third winding in the transformer 230 to provide Vcc voltage on the primary circuits increases together, and voltage of Vcc component increases. When increasing voltage of Vcc component on the primary circuits is sensed to be more than preset voltage, the zener diode 268 (ZD1) of the regulator 260 operates. The approved sensing voltage is approved to the base of the first transistor 265 and the collector of the second transistor 264.

When the voltage is approved to the base of the first transistor 265, the first transistor 265 is turned on, and the second transistor 264 is consecutively turned on. Thus, positive feedback occurs between the two transistors, and the two transistors 264, 265 are turned on.

While the first and the second transistors 265, 264 are turned on, distributing values of input voltage in the voltage distributors 261, 262, 263 are approved on BR components of PWM IC, and PWM IC stops the switching.

Herein, when high voltage is approved based on certain voltage, BR components of PWM IC completely stops the hard switching of PWM IC. When low voltage is approved, BR components of PWM IC operate the usual switching of PWM IC. By using the above components of PWM IC, stress of circuit components is alleviated by stopping the switching of PWM IC according to requested conditions.

Figure 4:
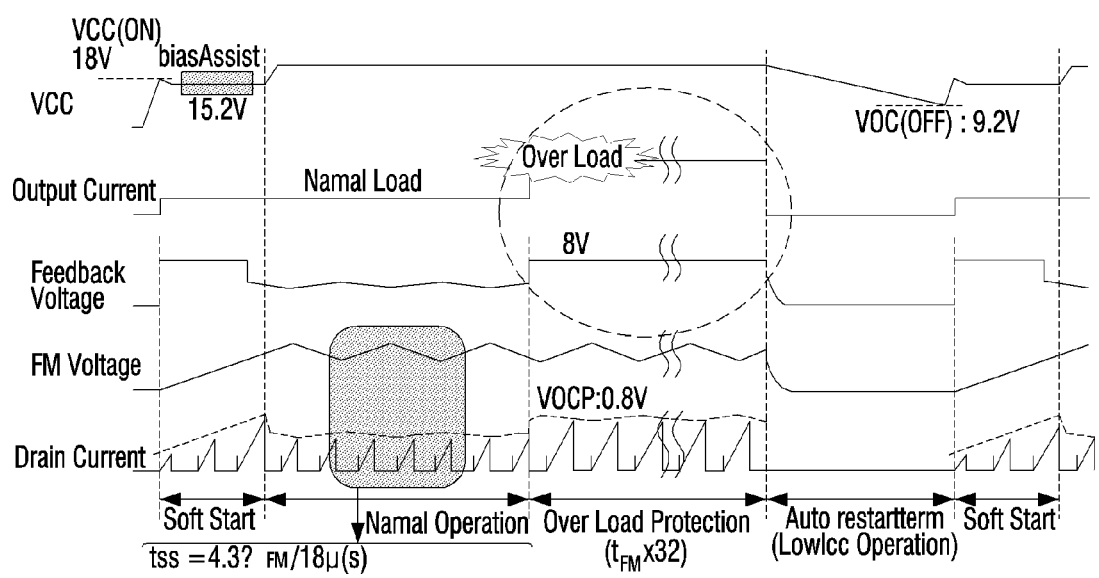
FIG. 4 is a waveform diagram provided to explain functions of PWM controller.

FIG. 4 is a waveform diagram provided to explain functions of PWM controller.

Referring to FIG. 4, PWM controller performs PWM switching by using feedback power. Herein, when feedback power increases in response to size of the sensed loading, PWM controller alternates PWM switching correspondingly to increasing size of loading.

When size of loads exceeds certain value, i.e., in overload or over voltage situation, PWM controller stops PWM function with the protection function. Further, PWM controller performs the auto-restart after preset time elapses.

Figure 5A:
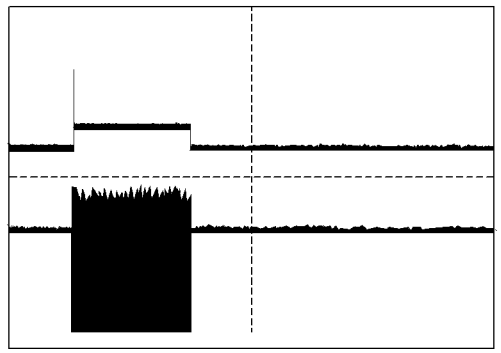
FIGS. 5A and 5B illustrate waveform diagrams of PWM IC output according to an embodiment.
Figure 5B:
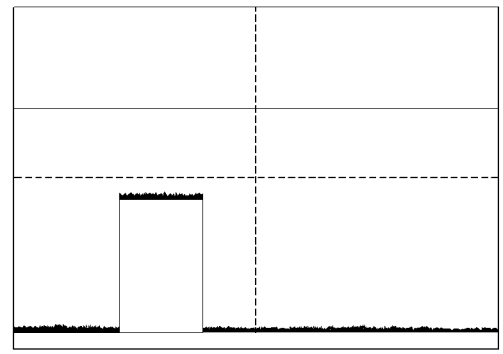

FIGS. 5A and 5B are outputting waveform diagrams of the power supply device when transient situation occurs according to an embodiment. For example, FIG. 5A is a waveform diagram of PWM switching in transient situation, and FIG. 5B is a waveform diagram of output voltage on the secondary circuits in transient situation.

Referring to FIGS. 5A and 5B, when transient situation occurs while PWM IC is performing PWM switching, PWM switching is confirmed to stop. Further, it may confirm that PWM switching does not restart even after preset time elapses after PWM switching stops. Thus, it may confirm that hard switching of the related PWM IC is not performed.

Further, because hard switching is not performed when comparing with FIGS. 9A and 9B, generating peak voltage disappears on the secondary circuits in transient situation.

Figure 6:
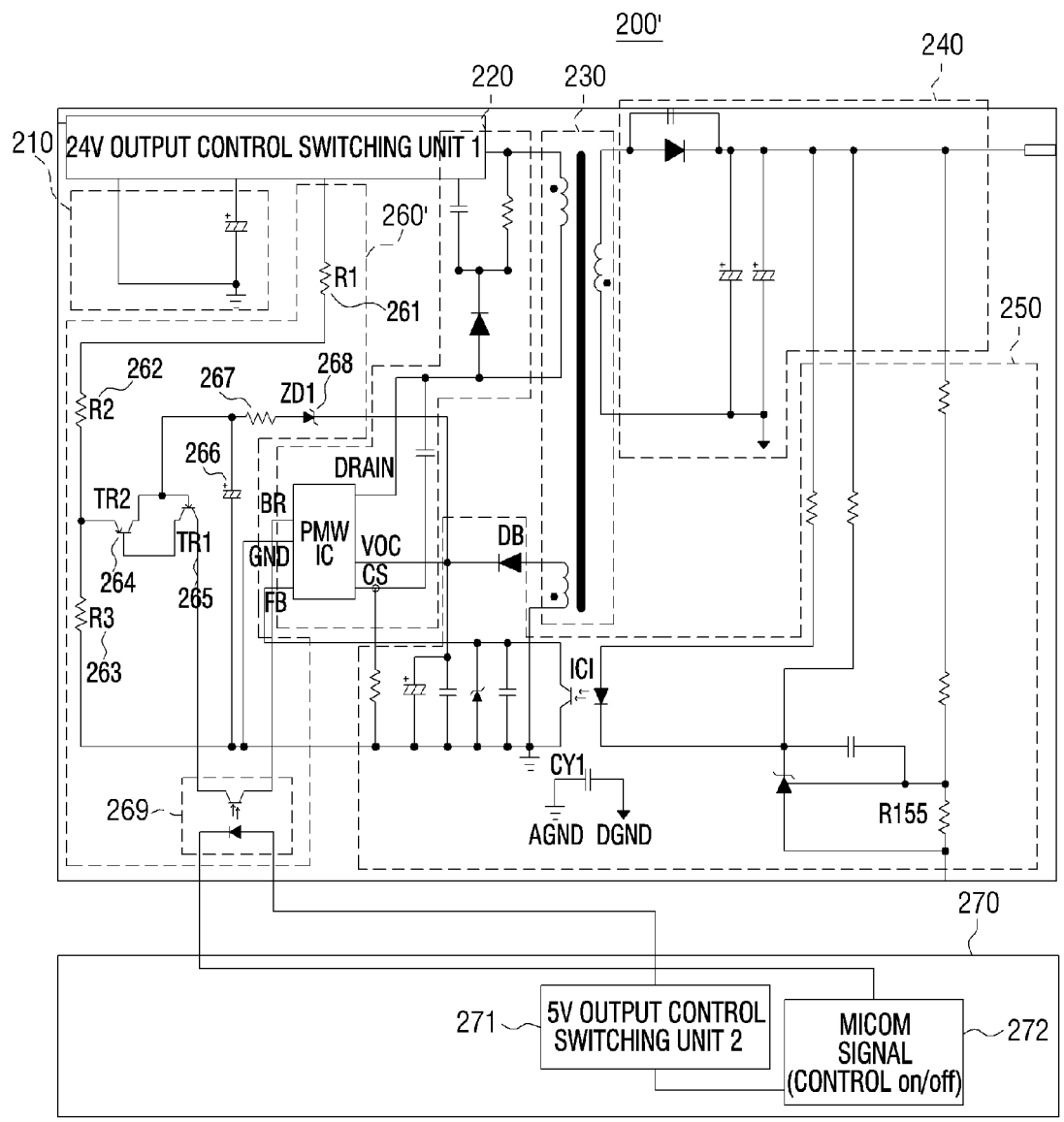
FIG. 6 is a circuit diagram of the power supply device according to an embodiment.

FIG. 6 is a circuit diagram of the power supply device according to a second embodiment. For example, the power supply device 200' according to the second embodiment selectively determines whether to limit the auto-restart function.

Referring to FIG. 6, the power supply device 200' may include the input 210, PWM controller 220, the transformer 230, the output 240, the sensor 250, the regulator 260', and a micro-computer 270. The power supply device 200' according to the second embodiment is uniform to the power supply device 200 according to the first embodiment in FIG. 3 except for the regulator 260' and the micro-computer 270. Explanations regarding the input 210, PWM controller 220, the transformer 230, the output 240, and the sensor 250 will not be further described.

The regulator 260' is constituted with the voltage distributors 261, 262, 263, the regulating circuits 266, 267, 268, the transistors 264, 265, and a switching unit 269. The voltage distributors 261, 262, 263 and the regulating circuits 266, 267, 268 are uniform to the components according to the first embodiment in FIG. 3, which will not be further described.

When output voltage of the regulating circuits 266, 267, 268 is higher than output voltage of the voltage distributors 261, 262, 263, the transistors 264, 265 are turned on and maintain turning-on situation. For example, the transistors 264, 265 may be constituted with the first transistor 265 and the second transistor 264.

Regarding the first transistor 265, the base commonly connects the output ends of the regulating circuits 266, 267, 268 and the collector of the second transistor 264, the collector connects one end of the switching unit 269, and the emitter connects the base of the second transistor 264.

Regarding the second transistor 264, the base connects the emitter of the first transistor 265, the collector commonly connects the output ends of the regulating circuits 266, 267, 268 and the base of the first transistor 265, and the emitter connects the output ends of the voltage distributors 261, 262, 263.

The switching unit 269 selectively connects the first transistor 265 to the brown in/out terminal (BR) of PWM IC.

The micro-computer 270 may control the switching unit 269 not to provide output signal of the transistors to PWM controller 220 so that the auto-restart function of PWM controller 220 is applied under a first condition, and to provide output signal of the transistors to PWM controller so that the auto-restart function of PWM controller 220 is not applied under a second condition. The micro-computer 270 may be provided when controlling of a second converter is required for increasing SMPS necessary amount and reducing consumption of power in the stand-by power. The micro-computer 270 may include 5V output control switching unit 271 and micom signal (control on/off) 272. The micro-computer 270 may be controller 150 described above or apparatus operating by controlling of the controller 150.

Figure 7:
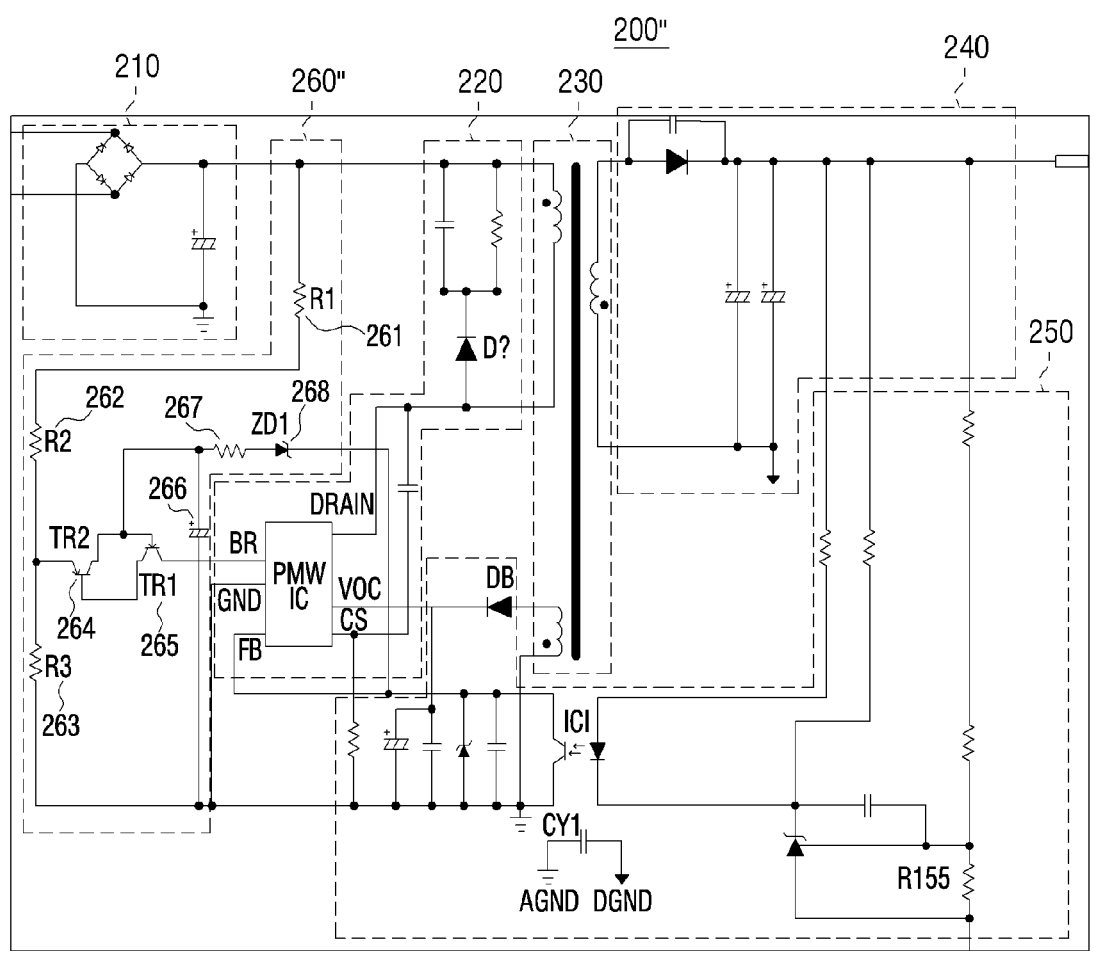
FIG. 7 is a circuit diagram of the power supply device according to an embodiment.

FIG. 7 is a circuit diagram of the power supply device according to a third diagram. For example, the power supply device 200" according to the third embodiment determines whether to limit the auto-restart of PWM controller 220 based on output current.

Referring to FIG. 7, the power supply device 200" may include the input 210, PWM controller 220, the transformer 230, the output 240, the sensor 250 and the regulator 260". The power supply device 200" according to the third embodiment is uniform to the power supply device 200 according to the first embodiment in FIG. 3 except for the regulator 260". Explanations regarding the input 210, PWM controller 220, the transformer 230, the output 240, and the sensor 250 will not be further described.

The regulator 260" is constituted with the voltage distributors 261, 262, 263, the regulating circuits 266, 267, 268, and the transistors 264, 265. The voltage distributors 261, 262, 263 and the transistors 264, 265 are uniform to those of the regulator 260 according to the first embodiment in FIG. 3. Thus, explanations regarding the voltage distributors 261, 262, 263 and the transistors 264, 265 will not be further described.

The regulating circuits 266, 267, 268 receive input of corresponding voltage to output current. For example, the regulating circuits 266, 267, 268 deliver voltage of the photo coupler to the transistors.

Thereby, the regulator 260" may perform the auto-restart function of PWM IC not to operate when the protection function is performed with OCP.

When implementing FIGS. 3 and 7; FIG. 3 describes that the auto-restart is not performed when performing the protection function with OVP, and FIG. 7 describes that the auto-restart is not performed when performing the protection function with OCP. In other words, the auto-restart function is not performed with one protection function. However, the circuits of FIGS. 3 and 7 are combined and implemented so that the auto-restart function is not performed regarding a plurality of protection functions.

Figure 8:
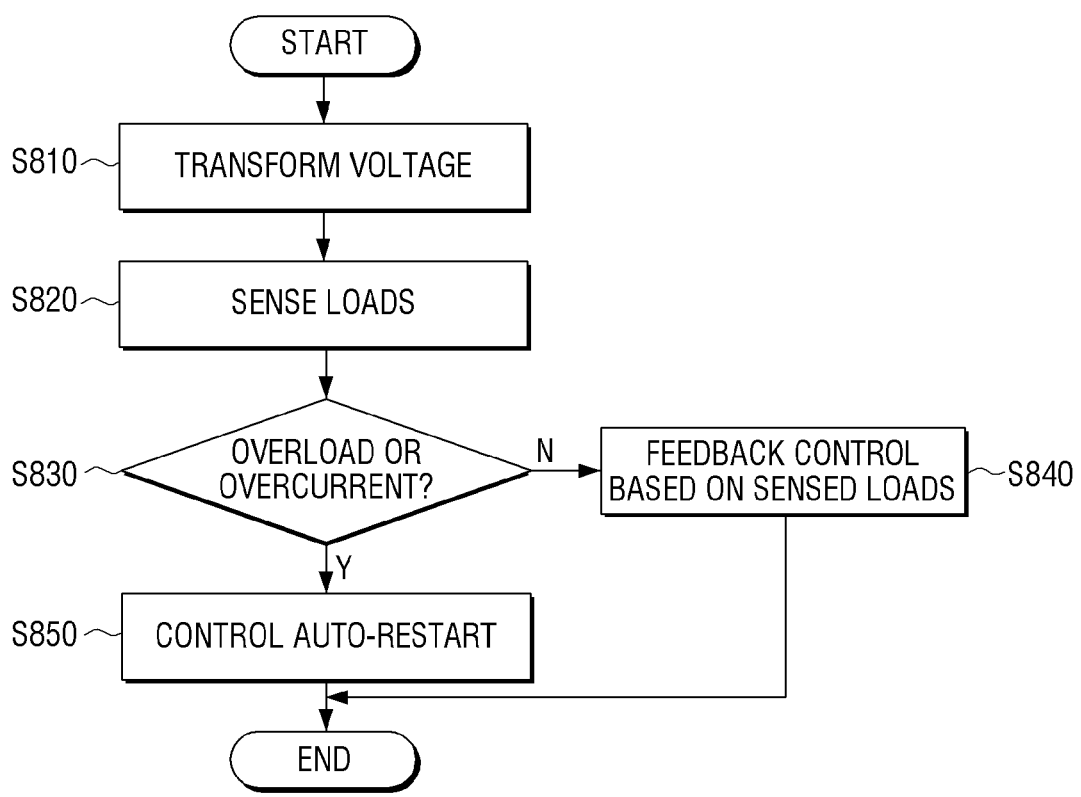
FIG. 8 is a flowchart provided to explain a power supply method according to an embodiment.

FIG. 8 is a flowchart provided to explain a power supply method according to an embodiment.

Referring to FIG. 8, externally provided voltage is transformed by using SMPS at S810.

At S820, outputting situation of the power supply device is sensed. For example, outputting situation may be sensed by sensing voltage and/or current on output end of the power supply device.

At S830, unusual situation is determined according to the sensed outputting situation. For example, it may be determined whether the protecting operation is needed or not based on a result of sensing whether the sensed voltage exceeds a preset voltage or the sensed current exceeds a preset current.

As a determining result, when the sensed outputting situation is usual at S830-N, feedback controlling according to the sensed loads is performed.

When the sensed outputting situation is unusual at S830-Y, i.e., when power or voltage on the secondary circuits is preset situation, it may control the auto-restart function not to be performed.

The power supply method according to the above embodiment limits the auto-restart function of PWM IC when transient situation occurs due to feedback loss of output loads on the secondary circuits. Thus, the system security is enhanced. The power supply method of FIG. 8 may be implemented on the power supply device having the constitution of FIG. 2, or on the other power supply devices having different constitutions.

Further, the foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A power supply device, comprising:
a transformer comprising primary winding and secondary winding;
a sensor configured to sense at least one of output voltage and output current of the power supply device;
a pulse width modulation, PWM, controller configured to perform PWM switching so that voltage is selectively provided to the primary winding based on at least one of the sensed output voltage and sensed output current; and
a regulator configured to stop PWM switching of the PWM controller and keep the PWM switching in stopped state when at least one of the sensed output voltage and sensed output current exceeds a preset value,
wherein the regulator comprises:
a voltage distributor configured to distribute input voltage at a preset voltage ratio;
a regulating circuit configured to deliver voltage or current in response to value of the sensed output voltage or sensed output current; and
a transistor configured to be turned on when the regulating circuit delivers voltage or current, and continuously output output voltage of the voltage distributor.

2. The power supply device of claim 1, wherein:
the PWM controller provides auto-restart function when at least one protection function is required, and
the regulator performs the auto-restart function of the PWM controller so as not to operate when at least one of the sensed output voltage and sensed output current exceeds the preset value.

3. The power supply device of claim 2, wherein the at least one protection function is at least one of OCP, over current protection, OLP, over load protection, OVP, over voltage protection, and TSD, thermal shot down protection.

4. The power supply device of claim 1, wherein the PWM controller is PWM IC, pulse width modulation integrated circuit, comprising a brown in/out terminal.

5. The power supply device of claim 4, wherein the regulator provides a preset first value of voltage to the brown in/out terminal when at least one of the output voltage and output current exceeds the preset value.

6. The power supply device of claim 1, wherein the transistor comprises:
a first transistor configured so that a base of the first transistor is connected to an output end of the regulating circuit, and a collector of the first transistor is connected to a brown in/out terminal of the PWM controller; and
a second transistor configured so that a base of the second transistor is connected to an emitter of the first transistor, a collector of the second transistor is commonly connected to an output end of the regulating circuit and the base of the first transistor, and an emitter of the second transistor is connected to an output end of the voltage distributor.

7. The power supply device of claim 1, wherein:
the transformer further comprises a third winding which alternates in voltage proportionally to voltage of the secondary winding, and
the regulating circuit delivers the voltage of the third winding to the transistor.

8. The power supply device of claim 7, wherein the regulating circuit comprises:
a zener diode configured to connect a cathode of the zener diode to one end of the third winding; and
a resistor configured to connect one end of the resistor to anode of the zener diode, and connect the other end of the resistor to inputting end of the transistor.

9. The power supply device of claim 1, wherein:
the sensor comprises a photo coupler configured to output corresponding voltage to the output voltage or output current, and
the regulating circuit delivers voltage of the photo coupler to the transistor.

10. The power supply device of claim 1, wherein the regulator further comprises:
a switching unit configured to selectively provide output signal of the transistor to the PWM controller.

11. The power supply device of claim 10, further comprising:
a micro-computer configured to control the switching unit not to provide output signal of the transistor to the PWM controller so that an auto-restart function of the PWM controller is applied under a first condition, and to provide output signal of the transistor to the PWM controller so that the auto-restart function of the PWM controller is not applied under a second condition.

12. The power supply device of claim 11, wherein:
the first condition comprises instant transient situation such as surge or ESD, electrostatic discharge, and
the second condition comprises transient situation due to feedback loss of output loads on secondary circuits.

13. An image forming apparatus, comprising:
a power supply device configured to provide power to the image forming apparatus;
a communication interface configured to receive printing data;
an image former configured to print the received printing data; and
a first controller configured to determine types of errors in the power supply device and control operation of the power supply device according to the determined types of errors,
wherein the power supply device comprises,
a transformer comprising a primary winding and a secondary winding;
a sensor configured to sense at least one of output voltage and output current of the power supply device;
a pulse width modulation, PWM, controller configured to perform PWM switching so that voltage is selectively provided to the primary winding based on at least one of the sensed output voltage and sensed output current; and
a regulator configured to stop PWM switching of the PWM controller and keep the stop PWM switching in stopped state when at least one of the sensed output voltage and sensed output current exceeds a preset value,
wherein the regulator comprises:
a voltage distributor configured to distribute input voltage at a preset voltage ratio;
a regulating circuit configured to deliver voltage or current in response to value of the sensed output voltage or sensed output current; and
a transistor configured to be turned on when the regulating circuit delivers voltage or current, and continuously output output voltage of the voltage distributor.

14. The image forming apparatus of claim 13, wherein:
the first controller controls output signal of the transistor not to be provided to the PWM controller so that auto-restart function of the PWM controller is applied under a first condition, and controls output signal of the transistor to be provided to the PWM controller so that the auto-restart function of the PWM controller is not applied under a second condition.

15. The image forming apparatus of claim 14, wherein:
the first condition comprises instant transient situation such as surge or ESD, electrostatic discharge, and
the second condition comprises transient situation due to feedback loss of output loads on secondary circuits.

16. The image forming apparatus of claim 13, wherein:
the PWM controller provides the auto-restart function when a protection function is required, and
the regulator performs the auto-restart function of the PWM controller so as not to operate when at least one of the output voltage and output current exceeds the preset value.

17. The image forming apparatus of claim 13, wherein the power supply device is switched-mode power supply, SMPS.

* * * * *